United States Patent Office 3,341,467
Patented Sept. 12, 1967

3,341,467
METHOD OF INHIBITING FOAMING IN AQUEOUS SYSTEMS
Chih M. Hwa, Arlington Heights, Ill., assignor to W. R. Grace & Co., New York, N.Y., a corporation of Connecticut
No Drawing. Filed Mar. 3, 1967, Ser. No. 620,255
7 Claims. (Cl. 252—321)

ABSTRACT OF THE DISCLOSURE

Phosphated alkoxy polyethyleneoxy ethanols are added to circulating water systems to inhibit foaming. These phosphated compounds have the structural formula

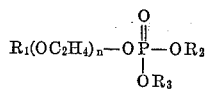

wherein $n$ is an integer from 2 to 50, $R_1$ is an alkyl group containing from 8 to 24 carbon atoms, and $R_2$ and $R_3$ can each be hydrogen or alkyl groups having from 1 to 24 carbon atoms.

---

This application is a continuation-in-part of application Ser. No. 415,808, filed Dec. 3, 1964, now abandoned.

The present invention relates to the treatment of circulating fresh water systems such as cooling towers, wet paint spray booths, and the like. The invention is particularly applicable to the treatment of circulating water used in air washing systems to prevent foaming of the water.

In the tobacco, textile, electronic, and other industries, impurities in air exist in the form of solid and liquid particles, such as fibers, oil particles, dust, and fumes that are objectionable for various reasons. In such industries, it is common practice to provide scrubbing units for washing the air free from such impurities, by circulating a fresh water stream into contact with the impurity laden air stream and providing for extended contact areas between the two streams. The mechanism by which the particles are removed in air scrubbers is similar to that in filtration, except that there may be an additional effect of condensation resulting in the growth of the size of the suspended particles.

To assure efficient operation of air scrubbing units, biocides and corrosion inhibitors have been introduced into the circulating water for the control of microbiological growth, corrosion, and scale formation. The introduction of these water treating chemicals, however, frequently causes excessive foaming problems under the splattering condition inherent in air scrubbers. During winter months, the substantial increase of dissolved solids in the circulating water due to humidifying the incoming air can further aggravate the foaming condition.

One of the objects of the present invention is to provide an improved method for treating circulating water systems in order to reduce or eliminate foaming tendencies.

Another object of the invention is to provide a method of inhibiting foaming in an air washing unit employing a circulating water stream for washing an air stream under conditions conducive to a foaming condition.

Still another object of the invention is to provide an improved method for inhibiting foaming in air scrubbing systems through the use of an improved foam inhibiting agent which is used in very small dosages.

Another object of the invention is to provide an improved composition which can be compounded in briquette form for introducing into circulating water systems.

Still another object of the invention is to provide an improved water treating composition particularly useful for treatment of water streams used in air washing, and containing an anti-foam agent which is compatible with the other water treating chemicals frequently employed in such systems.

In accordance with the present invention, the tendency of circulating water systems to foam is inhibited by introducing into the water a small amount of a phosphated alkoxy polyethyleneoxy ethanol having the structural formula:

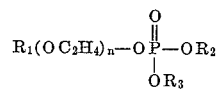

where $n$ is an integer greater than 1 and preferably from 2 to 50, $R_1$ is an alkyl group preferably containing from 8 to 24 carbon atoms, $R_2$ and $R_3$ are either hydrogen atoms or alkyl groups containing from 1 to 24 carbon atoms, and where $n$ is from 11 to 30, the total number of carbon atoms in $R_1$, $R_2$ and $R_3$ is at least 30, and where $n$ is from 31 to 50, the total number of carbon atoms in $R_1$, $R_2$ and $R_3$ is at least 48.

The compounds whose structural formula appears above are surface active materials, of the non-ionic type. A typical pH of a 1% solution in 75% isopropyl alcohol will be in the range from 6 to 7. The materials are clear liquids ranging from colorless to pale yellow, and having a viscosity at 80° F. on the order of 70 centipoises.

Whether used alone or in combination with other water treating chemicals, the dosage level of the foam inhibiting compound will normally range from 1 to 20 parts per million.

The foam inhibiting composition is most conveniently fed to the circulating water system in the form of a briquette in which the foam inhibiting phosphated compound is combined with a binder such as sodium sulfate, soda ash, or the like. In such a briquette, the foam inhibiting compound will normally constitute from 1 to 10% by weight.

The phosphated foam inhibiting compounds used according to the present invention are compatible with other water treating agents such as biocides, corrosion inhibiting compounds, and scale inhibiting compounds. Suitable biocides include the alkyl dimethyl aryl ammonium halides and sodium chlorophenates. When biocides are used, they are preferably added in amounts ranging from about 1 to 20 parts per million, and constitute from 1 to 10% by weight of the briquette.

The corrosion inhibiting ingredient of the new composition is preferably an alkali metal chromate although zinc dichromate may also be employed. The preferred corrosion inhibiting compounds are sodium chromate, potassium chromate, and sodium dichromate. When used, the corrosion inhibiting compounds are added to provide a concentration in the circulating water system from about 2 to 50 parts per million. The chromate content of the briquette will normally be from 1 to 20% by weight.

The improved foam inhibiting composition of the present invention, in a particularly preferred form, contains a scale inhibitor consisting of a molecularly dehydrated monovalent or combined mono- and polyvalent metal phosphate. Typical metal phosphates are the alkali metal phosphates having a ratio of alkali oxide to phosphorus pentoxide ranging from about 0.4 to 1 to about 2 to 1. Phosphates which fall within this class include compounds such as sodium heptaphosphate, tetrasodium pyrophosphate, sodium tripolyphosphate, sodium tetraphosphate, sodium hexametaphosphate, and sodium decaphosphate. In addition to the alaki metal phosphates, the polymetallic glassy phosphates such as sodium-zinc polyphosphate are also useful. The phosphate concentration in the circulating water system is normally on the order of 1 to 20 parts per million, and the polyphosphate preferably constitutes from 1 to 10% of the briquette by weight.

The briquette may be formulated by combining the foam inhibitor, the binder, and a small amount of water and compressing them to form a rigid briquette. As a typical example, I can use 5% of the foam inhibiting compound, 93% sodium sulfate, and 2% water and compress them under hydraulic pressure of 280 pounds per square inch.

The following examples illustrate the improved results to be obtained from the practice of the present invention, but should not be construed as limiting the invention.

*Example 1*

A circulating water containing 12.5 parts per million of a commercial biocide [50% n-alkyl (50% $C_{12}$, 30% $C_{14}$, 17% $C_{16}$, 3% $C_{18}$) dimethyl ethylbenzyl ammonium chloride, 50% n-alkyl (60% $C_{14}$, 30% $C_{16}$, 5% $C_{12}$, 5% $C_{18}$) dimethyl benzyl ammonium chloride] was treated with 3.2 parts per million of undecanoxy diethyleneoxy phosphonic acid, that is, a phosphated alkoxy polyethyleneoxy ethanol having the structural formula previously referred to wherein $R_1$ is a $C_{11}H_{23}$ group, $R_2$ and $R_3$ are hydrogen, and $n$ is 2. The addition of the anti-foam material resulted in a 38% reduction of foam height. In addition to its anti-foaming property, the addition of the anti-foam compound lowered the surface tension of the circulating water from 72 dynes per centimeter to 34.7 dynes per centimeter. This surface tension lowering property is particularly desirable in wetting the suspension particles collected in air scrubbers and maintaining the system clean.

*Example 2*

This example shows compounds with approximately 25 ethoxy groups and at least 30 carbon atoms which show substantial defoaming activity in aqueous systems as tested by the procedure of Example 1. These compounds have the structural formulas:

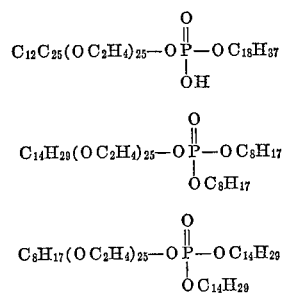

*Example 3*

This example shows compounds with approximately 45 ethoxy groups and at least 48 carbon atoms which show substantial defoaming activity in aqueous systems as tested by the procedure of Example 1. These compounds have the structural formulas:

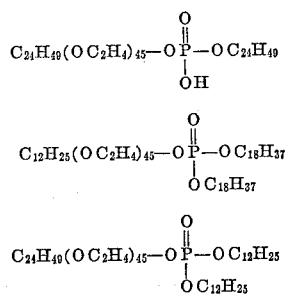

Obviously, many modifications and variations of the invention as hereinabove set forth can be made without departing from the essence and scope thereof, and only such limitations should be applied as are indicated in the claims.

The invention claimed is:

1. The method of inhibiting foaming in a circulating water system which comprises introducing into said water an effective amount of a phosphated alkoxy polyethyleneoxy ethanol having the structural formula:

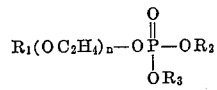

where $n$ is an integer of from 2 to 50, $R_1$ is an alkyl group containing from 8 to 24 carbon atoms, $R_2$ and $R_3$ are each selected from the group consisting of hydrogen atoms and alkyl groups containing from 1 to 24 carbon atoms, and where $n$ is from 11 to 30, the total number of carbon atoms in $R_1$, $R_2$, and $R_3$ is at least 30, and where $n$ is from 31 to 50 the total number of carbon atoms in $R_1$, $R_2$, and $R_3$ is at least 48.

2. The method of claim 1 wherein from 1 to 20 p.p.m. of the phosphated alkoxy polyethyleneoxy ethanol is introduced into said water.

3. The method of claim 1 wherein the circulating water system is an air washing unit employing a circulating water system for washing an air stream.

4. The method of claim 1 wherein $n$ in the structural formula is from 2 to 10.

5. The method of claim 1 wherein $n$ in the structural formula is from 11 to 30.

6. The method of claim 1 wherein $n$ in the structural formula is from 31 to 50.

7. The method of claim 2 wherein $n$ is 2, $R_1$ is a $C_{11}H_{23}$ group, and $R_2$ and $R_3$ are hydrogen.

References Cited

UNITED STATES PATENTS 1,970,578   8/1934   Schoeller et al. _____ 252—356 X
3,004,056   10/1961   Nunn et al. _____ 252—89 X
3,180,836   4/1965   Jurisch _____ 252—321

LEON D. ROSDOL, *Primary Examiner.*

H. B. GUYNN, *Assistant Examiner.*